April 1, 1958  A. D. GARRISON  2,829,264
DETECTION AND MEASUREMENT OF PENETRATIVE RADIATION
Filed Oct. 8, 1956
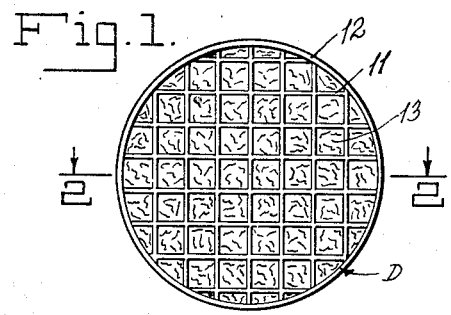
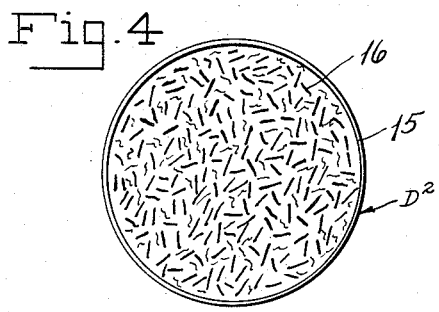
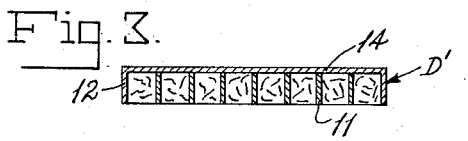
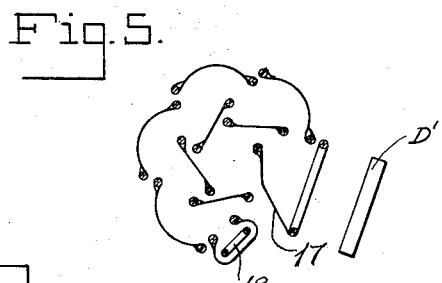
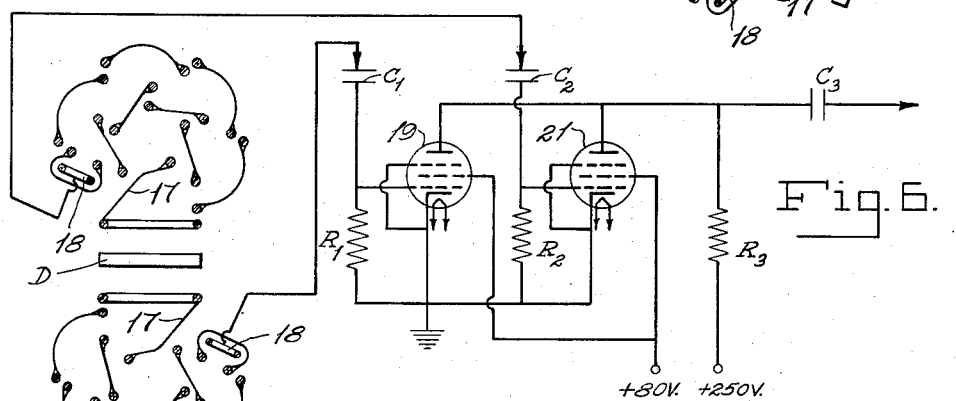
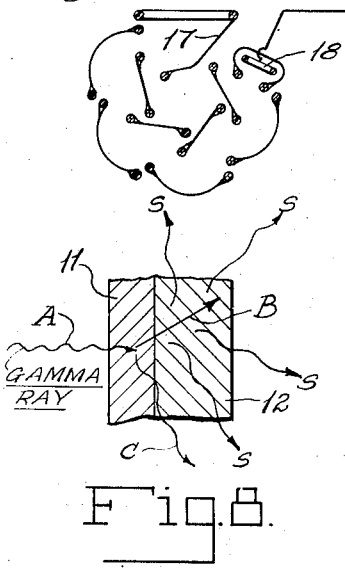
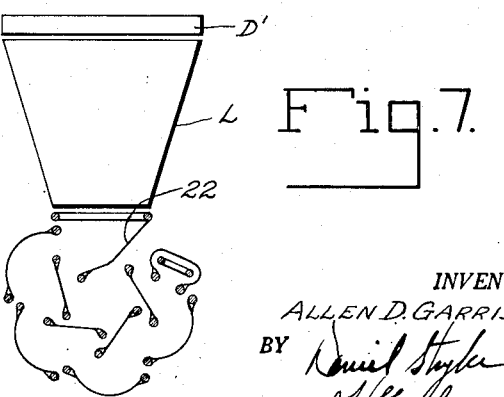
INVENTOR.
ALLEN D. GARRISON
BY
ATTORNEYS

United States Patent Office 2,829,264
Patented Apr. 1, 1958

2,829,264

DETECTION AND MEASUREMENT OF PENETRATIVE RADIATION

Allen D. Garrison, La Jolla, Calif., assignor to Texaco Development Corporation, New York, N. Y., a corporation of Delaware Continuation of application Serial No. 244,883, September 4, 1951. This application October 8, 1956, Serial No. 615,217

18 Claims.  (Cl. 250—71)

This invention relates to the detection and measurement of penetrative radiation and more particularly to means for measuring the intensity of such radiations as gamma rays.

This application is a continuation of my co-pending application Serial No. 244,883, filed September 4, 1951, now abandoned.

Many types of detecting and measuring devices have been proposed and used for the detection and measurement of penetrative radiation such as gamma rays. The sensitivities or efficiencies of such devices as developed and used thus far have been exceedingly low. For example the conventional Geiger-Mueller counter, perhaps the most commonly used device, has an efficiency for gamma rays of only about 0.5%. Obviously efficiency is an important factor particularly in the detection and measurement of small intensities of such radiation.

In overcoming the relatively low efficiency of the devices of the prior art, it is an object of this invention to provide novel detecting means for the detection and measurement of penetrative radiation such as gamma rays wherein the sensitivity or efficiency for such radiation is greatly increased.

Other objects and advantages of the invention will appear from the following description and claims taken in connection with the attached drawings wherein:

Fig. 1 is a plan of a detector unit embodying the invention.

Fig. 2 is a section taken on the line 2—2 of Fig. 1.

Fig. 3 is a similar section taken through a modified form of detector unit.

Fig. 4 is a plan of a second modified form of detector unit.

Fig. 5 illustrates an arrangement for combining the detector unit with an electron multiplier as of the photomultiplier tube type.

Figure 6 illustrates an arrangement wherein a detector unit in accordance with the invention is employed with a pair of electron multiplier devices connected to appropriate circuitry shown in schematic form;

Figure 7 illustrates an arrangement similar to that of Figure 5 wherein the luminophor is coupled to the photomultiplier by means of a convergent light pipe; and, Figure 8 illustrates diagrammatically the interaction of a gamma ray with a combination of luminophor and high electron density material in accordance with the invention.

In brief, the present invention can be said to involve the combination of: (1) a radiation detector component comprising a first constituent capable of interacting with penetrative radiation of the high-energy photon type (e. g. X-rays and gamma rays) to occasion a release of less penetrative radiation (e. g. electrons and lower energy photons), and a second constituent disposed to lie athwart the likely path or paths of the less penetrative radiation as well as athwart likely extensions of paths of any of the original penetrative radiation which may have escaped absorption in the first constituent, the second constituent being of such a nature that it will interact efficiently with radiation less penetrative than the original high-energy photons (i. e. either any portion of the original which escaped full absorption or any of the less penetrative radiation into which part of the original was translated in the first constituent) to produce a scintillation in the ultraviolet and visible ranges of the spectrum; and (2) a scintillation-detector component which is sensitive to light photons in these special ranges and therefore to scintillations produced in the detector component. The first constituent may be a heavy metal or any substance of high electron density, the second constituent a luminophor, and the scintillation detector a phototube of the electron multiplier type or a photosensitive surface coupled with a measuring means for recording separate pulses therefrom such as is described in the copending application of Charles F. Teichmann, filed January 13, 1950, Serial No. 138,341, issued on November 9, 1954, as Patent No. 2,694,152.

Returning to Fig. 1, the detector D therein shown is cellular in type, the walls 11 of the cells being formed of a good gamma ray absorbing metal. The metal is preferably of high atomic number and of electron density of $5 \times 10^{23}$ electrons/cc. or higher. Suitable metals with their electron densities are indicated below:

|  | Electrons/cc. |
|---|---|
| Lead | $27 \times 10^{23}$ |
| Tungsten | $47 \times 10^{23}$ |
| Platinum | $52 \times 10^{23}$ |
| Bismuth | $23 \times 10^{23}$ |

The above electron densities are calculated by the following formula:

$$\frac{ZN\rho}{A}$$

wherein Z is the sum of atomic numbers of the atoms in the molecule

N is Avogadro's number $\rho$ is the density in grams/cc.

A is the sum of atomic weights of the atoms in the molecule

For example, since the values of Z, N, $\rho$, and A for lead chloride ($PbCl_2$) are: $Z = 82 + 2 \times 17 = 116$; $N = 6.02 \times 10^{23}$; $\rho = 5.8$; and $A = 207 + 2 \times 35.5 = 278$, one may apply the formula, $$\frac{ZN\rho}{A} = \text{electron density}$$

to this material as follows:

$$\frac{116 \times 6.02 \times 10^{23} \times 5.8}{278} = 14.6 \times 10^{23}$$

electrons per cubic centimeter.

In determining the proper thickness for the metal two factors should be balanced against each other to the end of attaining the greatest possible excitation of the luminophor. One factor is that if the metal is not thick enough there will not be a maximum translation of penetrative radiation into less-penetrative radiation. The other factor is that if the metal is too thick it will absorb energy of the less-penetrative radiation which preferably should be absorbed by the luminophor.

Other metals such as silver and tantalum or any element above tantalum in atomic number and of the requisite electron density, excluding radioactive metals, may be used. While the cells have been shown as substantially square, it is to be understood that they may be in other shapes such as polygonal, circular or otherwise.

Preferably the metal cell walls are polished to function as reflectors and collimators in a manner to be later described. It is to be understood that the walls need not be formed entirely of metal since a thin plating or coating of metal on a suitable base such as a plastic (polystyrene, methyl-methacrylate, etc.), or other material may be used. The cellular structure is preferably surrounded by a band 12 of the same type metal as employed in the cell walls.

Each cell is filled with a so-called luminophor 13 i. e., a substance which under the influence of penetrative radiation such as of Compton electronic bombardment emits scintillations or light bursts which are capable of detection by a photo-sensitive device such as a photo-tube of the electron multiplier type. Organic materials in this class include naphthalene, anthracene, phenanthrene, stilbene, terphenyl, or combinations thereof. Inorganic materials include zinc sulfide, zinc silicate, scheelite, synthetic calcium tungstate and sodium iodide. Such materials may be used alone or they may be dispersed in a suitable liquid or solid matrix as disclosed in Patent No. 2,559,219 of Clifford G. Ludeman issued July 3, 1951.

As viewed in Fig. 2, the thickness of the luminophor may vary depending upon its self-absorption for the radiation generated therein. Obviously it is not desired to make the element of such thickness that radiation developed in the luminophor will be absorbed thereby before passing out the end walls of the element. This thickness will vary with different materials as is well known and can be easily determined in each case. The luminophor should therefore be transparent or translucent to a degree such that the radiation developed therein can pass outwardly to the ultimate detecting device with the least possible diminution in intensity.

It will be observed that in the element of Figs. 1 and 2, both sides are open so that radiation developed in the luminophor is free to and obviously will escape at either or both ends. As hereinafter explained, means is provided for the detection and subsequent measurement of such radiation by devices placed at opposite sides of the detector element.

Fig. 3 represents a section through a detector $D^1$ wherein the enclosing metal is continued over one side thereof as at 14 to form a cap-like cover, this arrangement being used where the device for detecting the radiation from the luminophor is employed at only one side of the element. In this case, cover 14 preferably has an additional function as a reflector for the developed radiation.

Fig. 4 is a plan of a different type of detector $D^2$ wherein the luminophor is mounted within an enclosing ring 15 with the metal, in the form of flakes, i. e., small thin plates 16, distributed through it in a somewhat haphazard manner. The plates, which may be either flat or curved as viewed in Fig. 4, should have their axes substantially normal to the planes of the sides of the detector to minimize their interference with transmission to the scintillation detector of light generated in the luminophor. As in the detector of Fig. 1, the metal plates or elements preferably are highly polished so that any radiation striking thereon will be reflected. If the nature of the luminophor permits, the metal plates may be supported therein directly. Alternately, a plastic matrix of the type disclosed in the aforesaid Ludeman patent may be used for both the luminophor particles and the metal plates.

In operation, the metal grid or cell framework has two functions. First, it functions to translate penetrative radiations into less penetrative radiations in such a way that there is greater absorption of the available energy by the luminophor. With the large number of metal elements present, their dispersed arrangement, and the density of the metal, the possibility of intercepting a substantial portion of the original penetrative radiation is very greatly increased over when a simple luminophor is used alone. Second, the metal elements which are polished function as reflectors and collimators for the light produced in the phosphor.

Referring to Fig. 8 a penetrative gamma ray A, on entering detector D, can be absorbed in any of three well-known processes: (1) The Compton effect wherein a gamma ray reacts with an electron and imparts some of its energy thereto, resulting in a fast-moving electron and a secondary, less-penetrative gamma ray having smaller energy than the primary gamma ray; (2) the photoelectric effect wherein the entire energy of the gamma ray is converted to kinetic energy of the electron, and no secondary gamma ray is produced; and (3) pair formation, wherein a gamma ray of energy larger than one million electron volts can react near a nucleus to give rise to a positive-negative electron pair, these events being usually rare.

It is a fact that if one increases the atomic number of the absorber, the efficiencies of all three kinds of conversion will also increase, each to different extent. The Compton effect increases directly and proportionately with the atomic number ($Z^1$); the photoelectric effect increases much more, that is, by a factor equal to the atomic number to the fourth power ($Z^4$); and pair formations increase as ($Z^2$). Because of this, it is desirable to have as high as possible an atomic number for the first constituent of the detector (the metallic constituent of which the walls 11 are made). This composite structure for the detector is employed herein since at present it is difficult to make a good luminophor containing elements of high atomic number.

Neglecting the rare cases of pair formations, the impingement of ray A on the detector D can produce effects as follows: it can interact with the constituent 11 which it is more likely to do, or it can interact with the constituent 13, which it is less likely to do, to produce in either case either a high-energy-electron B alone (by the photoelectric effect) or an electron B and with it a less-penetrative and lower-frequency gamma ray C (by the Compton effect). In a case where it does the latter, then the ray C, like the original ray A, in an interaction which is more likely to take place with the matter of the first constituent 11 than with that of the second 13, may produce either an electron B alone or an electron B and a ray C. Whenever any A or C ray completely escapes from the detector all of its energy is lost for the purposes herein. On the other hand, all of the energy of any A or C ray which does not escape or all of the energy thereof which is absorbed prior to its escape ultimately produces electrons B. If an electron B expends its energy in the luminophor it causes or intensifies a scintillation therein. Therefore one can say in such a case that the interaction which produced this electron turned out to be productive. If instead an electron B expends its energy in the first constituent 11 or if it escapes from the detector D altogether then it will neither cause nor intensify a scintillation. Therefore one can say in such a case that the interaction which directly produced this electron turned out to be non-productive.

The use of the highly absorbent first constituent 11 as taught herein, increases the total number of productive interactions because (I) a good part of the many interactions which occur in the dense constituent 11 usefully send electrons B into the luminophor 13 thereby adding their number to the relatively few productive interactions which occur directly in the luminophor; and (II) a good part of the many interactions which occur in constituent 11, whether they send electrons B into the luminophor to produce even more productive interactions.

The relatively large number of productive interactions produced in a detector D of the kind shown herein can be divided into two groups: (1) Productive interactions which do not coincide in time with any others, and (2) productive interactions which occur simultaneously. Any increase in the number of productive interactions of group 1, which is achieved by the improvement of the present invention, clearly results in an increase in the total number of counts which will be made by the improved detection apparatus, and any increase in the number of group II productive interactions, which is achieved will increase the light intensity of some of the scintillations, produced as part of the detection process, thereby increasing the certainty and accuracy of counting.

For optimum results the walls of the first constituent 11 must neither be too thick nor too thin. If they are excessively thick a large number of interactions may occur in the first constituent but many of them will be nonproductive because it will absorb too much of the energy of the electrons B produced by them. On the other hand, if the walls are too thin many A and C rays will escape entirely from the detector D before they can be translated into potentially-productive electrons B. The optimum wall thickness, i. e., that resulting in the largest number of productive interactions, can be determined empirically or by the use of mathematics treating it as a function of: (1) the electron density of the material of the first constituent 11; (2) that of the material of the second constituent; and (3) the average penetrative energy of the rays which are to be detected. As an example in a detector D for one megavolt gamma rays in which the first constituent is lead and the second is naphthalene in crystal form, an optimum thickness for the walls is about 1.5 millimeters and good results are obtainable for thickness of between 1 and 2 milliliters.

Referring to Fig. 5, detector $D^1$ is shown with one face adjacent the cathode 17 of a photo-tube of the electron-multiplier type. Typical tube types for such a purpose are the 931-A, 1P21, 1P28 and 5819 manufactured by the Radio Corporation of America. Assuming that the tube selected has suitable sensitivity to the light generated in the luminophor, then when some of this light impinges upon cathode 17, photo-electrons will be emitted thereby and their number will be multiplied at successive dynode stages in a well-known manner to result finally in the collection of a large electron current impulse at an anode 18. The anode 18 is connected to a suitable counting circuit which indicates and/or records the number of pulses. Such circuits, many of which employ thyratrons as off-to-on switches readily actuatable by a pulse of very short duration, are well known to the art and a detailed description thereof is not considered necessary.

Present types of electron multiplier tubes, such as the RCA tubes above identified, are usually most responsive to blue light and near ultra violet. Consequently a luminophor selected for use with one of these tubes should be able to generate a maximum of such light. However it is to be understood that for use with electron multipliers sensitive to other types of light, other suitable types of luminophors should be employed. Stated otherwise, the luminophor is determined by the sensitivity of the electron multiplier or other photo-sensitive element, or vice versa.

Fig. 6 illustrates a modification wherein detector D is employed in an arrangement in which its two faces are adjacent the respective cathodes 17 of two photo-electron-multiplier tubes. With this arrangement, radiation produced in the phosphor escapes from each side of the detector (from each of its "faces") and is observed simultaneously by the two cathodes 17. This arrangement is possessed of a marked advantage in that it enables the background noise pulses produced by thermal emission in the electron multipliers to be reduced by the use of two tubes in combination with a coincidence circuit as shown.

This circuit, comprises two paralleled tubes 19, 21 which have a common load resistor $R_3$ through which they are both connected to a source of anode potential. The resistor $R_3$ preferably has a very high resistance value as compared to the static plate resistance of either of the tubes when it is operated with a nearly zero bias. Both tubes are normally biased, i. e., between their grids and cathodes, at nearly zero volts so that the drop in potential between their commoned cathodes and anodes is negligibly small as compared to the drop across $R_3$. As a result if a negative pulse arrives at the control grid of only one of the tubes, whereby only its internal resistance changes to a much higher value, there will be very little effect on the combined (paralleled) internal resistances of the two of them taken together and the drop in potential across resistance $R_3$ will undergo only a very small change. However if negative pulses are received on the grids of both of the tubes, i. e., from both anodes 18, their paralleled internal resistances will no longer have a much smaller value than the resistance of $R_3$ and the voltage drop across $R_3$ will be greatly reduced. As a result a strong positive pulse will pass over coupling condenser $C_3$ to an output suitable for connection to a counting circuit and/or a recording device. Of course a scaling circuit may be used in the customary manner if desired.

With this arrangement, there is assurance that each scintillation produced within detector D, since it will radiate light simultaneously from both sides of the detector, will be registered whereas background noise, not created as a result of a process in the phosphor, will not, e. g., negative pulses transmitted through anodes 18 by reason of random thermal emission from the cathodes 17 will be haphazarded, non-coincident, and therefore will not register. Thus, this arrangement provides an effective method for substantially eliminating this undesirable background noise.

It is also to be understood that this specific circuit is disclosed only by way of example and that other circuits of the so-called coincident type may be substituted therefor.

Fig. 7 illustrates an arrangement wherein a detector element having a relatively large surface can be efficiently employed in combination with an electron multiplier having a cathode with only a relatively small area. In the arrangement shown, detector $D^1$ is positioned adjacent the large end of a condensing light pipe L, which may be formed of quartz, polystyrene, methyl-methacrylate or the like, while the cathode 22 of the photo-multiplier tube is adjacent its small end. If desired any other suitable condensing optic may be used such as a double convex lens or a concave mirror. The pipe L will act in a known manner to intercept light which emerges toward it from any part of the relatively-large-area of the detector $D^1$ and to transmit it convergently to the relatively-small-area of the cathode 22. Without such an arrangement, a large amount of the light developed in the luminophor would be lost as respects the photo-electron-multiplier tube and the efficiency of the device considerably reduced. A light condensing means of this kind can also be used in an arrangement as in Fig. 6 in which two phototubes are used with a single detector D.

Obviously many modifications and variations of the invention, as hereinbefore set forth, may be made without departing from the spirit and scope thereof, and therefore only such limitations should be imposed as are indicated in the appended claims.

I claim:

1. A detector of penetrative radiation of the high-energy photon type such as X-rays and gamma rays comprising as a unitary structure two closely interjoined constituents, only the first of said two constituents comprising a luminophor and the second of said constituent comprising a non-fissionable and non-radioactive material having a much higher electron density than said luminophor, substantially all of the surface area of said second constituent being in direct juxtaposition to the surface of said luminophor, said unitary structure including a surface adapted and arranged to be exposed to penetrative radiation to be detected, said second constituent being disposed throughout said luminophor, increments of said second constituent having a major axis generally perpendicular to said surface and a minor axis generally transverse to said major axis, whereby penetrative radiation may impinge upon said second constituent along likely paths of penetration of such radiation and whereby a significant part of said radiation is absorbed by said second material to produce interactions therewith which result in the production of radiation therefrom capable of causing scintillations of said luminophor.

2. A scintillation type detector of penetrative radiation of the high energy photon type such as X-rays and gamma rays comprising as a unitary structure first and second constituents, only the first of said constituents being a luminophor and the second constituent being a non-fissionable non-radioactive material of much higher electron density than the first constituent, said unitary structure including a detecting surface adapted and arranged to be exposed to penetrative radiation to be detected, said second constituent comprising at least one member of relatively thin sheet-like configuration and being disposed throughout said detector in juxtaposition with said first constituent over large portions of its surface area with an edge thereof generally transverse to said detecting surface in such manner that penetrative radiation impinging upon said surface may impinge upon said second constituent, the thickness of said second constituent being sufficient along likely paths of radiation impinging upon said surface to cause the emission therefrom of less penetrative radiation that is capable of exciting the luminophor as an indication of radiation impinging upon said second constituent.

3. A detector as in claim 2 in which said second constituent has an electron density of not less than $5 \times 10^{23}$ electrons per cubic centimeter.

4. A detector as in claim 2 in which said luminophor is naphthalene, said second constituent is lead, and the dimension of the lead in a direction generally transverse to the detecting surface is between one and two millimeters, thereby to provide a detector that is suited to the detection of gamma rays of energy range averaging about one million electron volts.

5. A scintillation type detector as in claim 2 wherein the second constituent is in the form of discrete flakes of sheet metal having their shortest dimension in generally transverse relationship to the likely paths of radiation impinging upon the detecting surface.

6. A scintillation type detector of penetrative radiation of the high energy photon type comprising a lattice structure defining a plurality of cells, a luminophor disposed throughout said cells in juxtaposition to the lattice walls, said walls being formed of a non-fissionable non-radioactive material of much higher electron density than the luminophor, whereby penetrative radiation impinging upon said walls may cause the emission of less penetrative radiation that is capable of exciting the luminophor.

7. A detector as in claim 6 which further comprises a layer of metal of higher electron density than the luminophor disposed as a superficial layer over said cells.

8. A detector as in claim 2 wherein the unitary structure includes two opposed sides whose dimensions are substantially larger than the distance between them and in which the material of higher electron density forms a honeycomb arrangement of cells extending between the two sides and wherein the respective cells are substantially filled with the luminophor.

9. A detector as in claim 8 which further includes a photo-electric device having a photo-sensitive element exposed to light which may emerge from one of the sides of said unitary structure, and means for indicating the output of said photo-electric device in response to light emitted from said luminophor.

10. A scintillation type detector of penetrative radiation of the high energy photon type comprising as a unitary structure first and second constituents, only the first of said constituents being a luminophor and the second being a non-fissionable non-radioactive material of much higher electron density than the first constituent, said two constituents being disposed throughout a matrix that is substantially permeable to radiation of the wavelength emitted by the luminophor upon excitation by penetrative radiation.

11. A scintillation type detector as in claim 10 wherein said matrix is in the form of plastic material in the solid phase.

12. A scintillation type detector as in claim 11 wherein the second constituent comprises a plurality of metal elements disposed throughout the matrix.

13. A scintillation type detector as in claim 11 wherein the second constituent is in the form of a plurality of discrete flakes of sheet metal having their shortest dimension in generally perpendicular relationship to a predetermined detection axis of the structure.

14. A detector as in claim 10 in which said second constituent has an electron density of not less than $5 \times 10^{23}$ electrons per cubic centimeter.

15. A detector as in claim 10 in which said material of high electron density is lead, and the dimension of the lead as measured in directions generally perpendicular to the detecting surface of the luminophor is between one and two millimeters.

16. A detector as in claim 13 wherein the metal elements are highly light reflective.

17. A scintillation type detector of penetrative radiation of the high energy photon type comprising a lattice-like structure defining a honeycomb arrangement of cells, said cells being substantially filled with a luminophor dispersed throughout a matrix that is substantially permeable to radiation of the wave-length emitted by the luminophor upon excitation by penetrative radiation, said lattice-like structure being formed of a material having a much higher electron density than that of the luminophor.

18. A detector as in claim 17 comprising two generally opposed sides having the respective cells extending therebetween and wherein the matrix is in the form of plastic material in the solid phase.

No references cited.